United States Patent [19]
Greenway

[11] Patent Number: 5,551,407
[45] Date of Patent: Sep. 3, 1996

[54] FUEL-AIR MIXING APPARATUS AND METHOD FOR GASEOUS FUEL ENGINES

[75] Inventor: Donald Q. Greenway, Georgetown, Tex.

[73] Assignee: Greenway Environmental Research, Georgetown, Tex.

[21] Appl. No.: 528,729

[22] Filed: Sep. 15, 1995

[51] Int. Cl.⁶ .................................................. F02M 21/04
[52] U.S. Cl. ............................................ 123/527; 48/144
[58] Field of Search ..................................... 123/527, 525, 123/526, 27 GE; 48/144

[56] References Cited

U.S. PATENT DOCUMENTS

| | | |
|---|---|---|
| 26,145 | 1/1967 | Friddell . |
| 4,440,137 | 4/1984 | Lagano et al. . |
| 4,479,466 | 10/1984 | Greenway et al. . |
| 4,499,885 | 2/1985 | Weissenbach . |
| 4,520,785 | 6/1985 | Batchelor . |
| 4,535,728 | 8/1985 | Batchelor . |
| 4,541,397 | 9/1985 | Young . |
| 4,596,211 | 6/1986 | Szloboda . |
| 4,649,811 | 9/1987 | Bennett . |
| 4,813,394 | 3/1989 | St. Clair . |
| 4,829,957 | 5/1989 | Garretson et al. . |
| 4,872,440 | 10/1989 | Green . |
| 4,911,124 | 3/1990 | Bennett . |
| 4,991,561 | 2/1991 | Gerassimou ............................. 123/527 |
| 4,997,458 | 3/1991 | Jones ....................................... 123/527 |
| 5,000,138 | 3/1991 | Bennett . |
| 5,174,259 | 12/1992 | Shinzawa . |
| 5,311,849 | 5/1994 | Lambert et al. ......................... 123/527 |
| 5,315,981 | 5/1994 | Chen . |
| 5,377,646 | 1/1995 | Chasteen . |
| 5,408,978 | 4/1995 | Davis ....................................... 123/527 |

*Primary Examiner*—Erick R. Solis
*Attorney, Agent, or Firm*—Russell D. Culbertson; Shaffer & Culbertson

[57] ABSTRACT

A fuel-air mixer body (12) includes a mixer passage (14) extending therethrough with a fuel release body (24) positioned centrally within the mixer passage. A flow control section (28) of the mixer passage (14) is defined between the inner wall (20) of the mixer passage (14) and the outer wall of the fuel release body (24), and includes a flow restricting section (30) and a flow area increasing section (32). As input air to be mixed with fuel for combustion flows through the mixer passage (14), a relatively high pressure area is formed in the flow restricting section (30), a first pressure reduction area is produced in the flow area increasing section (32), and a second pressure reduction area is produced downstream from the fuel release body (24). Gaseous fuel may be released into the air flow at two separate locations. The first location is in the flow area increasing section (32) and the second location is at the end of the fuel release body (24). The method of the invention includes producing the relatively higher pressure area within the mixer passage (14), two separate reduced pressure areas within the passage, and releasing gaseous fuel in the two reduced pressure areas to produce the desired fuel-air mixing.

18 Claims, 2 Drawing Sheets

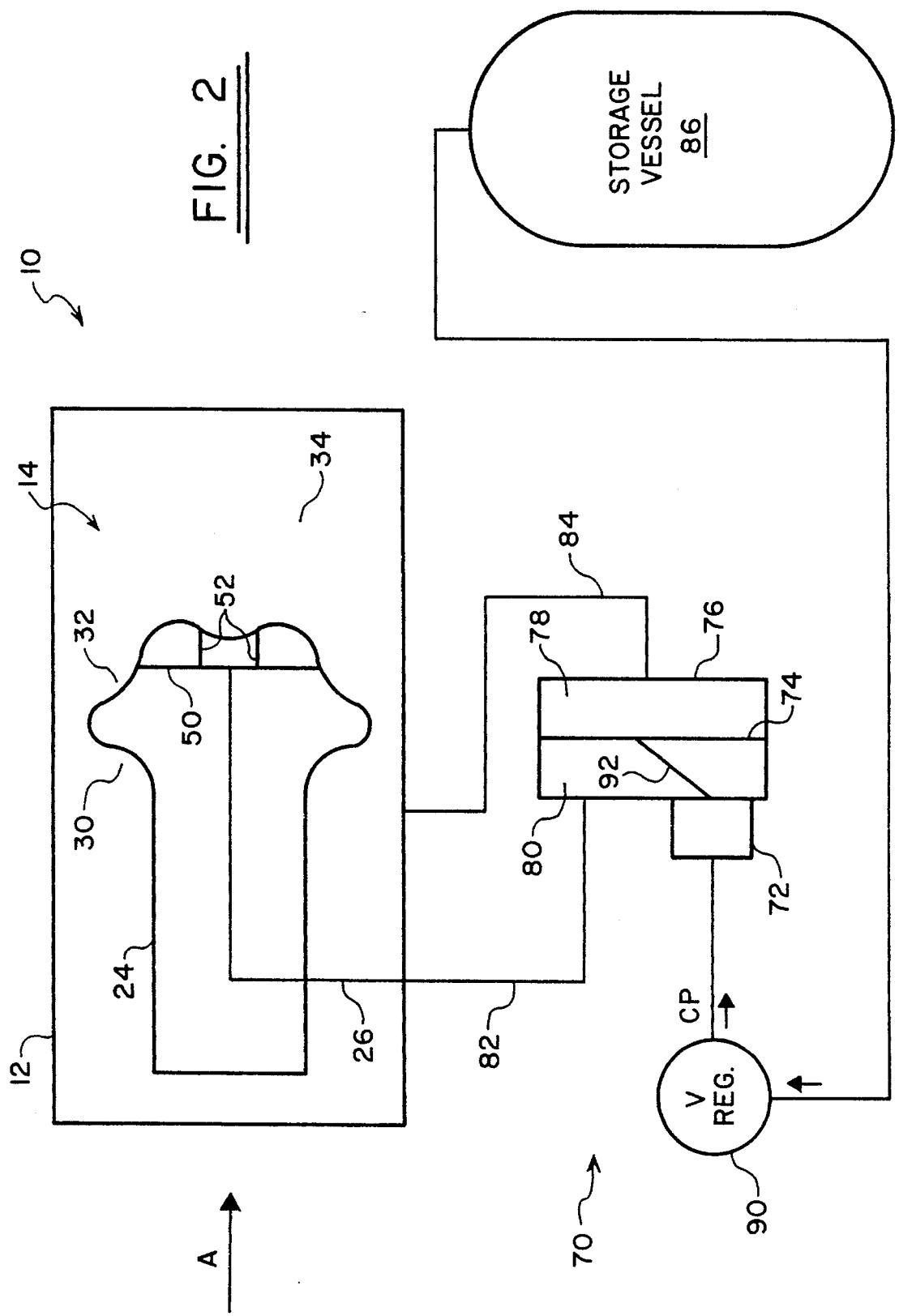

FUEL-AIR MIXING APPARATUS AND METHOD FOR GASEOUS FUEL ENGINES

BACKGROUND OF THE INVENTION

This invention relates to internal combustion engines adapted to run on gaseous fuels and particularly to a fuel-air mixing apparatus and method for use in gaseous fuel burning engines including gasoline and diesel engines converted to use gaseous fuels.

Natural gas or methane, and other light hydrocarbon gases may be used as fuel in internal combustion engines and are desirable both for availability and environmental reasons. Natural gas and other hydrocarbon gases are relatively plentiful in certain geographic areas as compared to standard liquid fuels, such as gasoline and diesel fuel. Also, natural gas and other petroleum gases can be relatively clean burning as compared to traditional liquid fuels, particularly diesel fuel. Thus, replacing gasoline and diesel burning vehicles with natural gas and other gaseous fuel burning vehicles can make a significant reduction in emissions which cause air pollution. In fact, some governmental authorities are mandating the elimination of diesel fuel powered vehicles, or limiting the use of diesel and other liquid fuels in an effort to reduce air pollution.

However, there are a number of problems associated with using natural gas and other petroleum gases as fuel in internal combustion engines. One major problem with such gaseous fuels in internal combustion engines, is in mixing the fuel with air prior to combustion. Poorly mixed fuel and air causes less than optimal combustion in the engine and can increase undesirable emissions.

SUMMARY OF THE INVENTION

It is a general object of the invention to provide a fuel-air mixer apparatus and method that overcomes the above-described problems associated with using gaseous fuels in internal combustion engines. More specifically, it is an object of the invention to provide a fuel-air mixer apparatus and method that provides improved fuel-air mixing for optimal combustion in an internal combustion engine.

In order to accomplish these objects, a fuel-air mixer apparatus includes both a new fuel release structure and a new input air flow structure which cooperate to produce the desired fuel-air mixing and fuel metering. The fuel release and input flow structures according to the invention may be used with any internal combustion running on a gaseous fuel. However, the invention is particularly useful in gasoline and diesel engines converted to use gaseous fuels. Also, the mixer apparatus and method of the invention is well suited for use in either normally aspirated, turbocharged, or supercharged gasoline and diesel engines converted to run on gaseous fuels.

The input air flow structure includes a mixer body with a mixer passage extending therethrough. The mixer passage has an inlet end and an outlet end, and a fuel release body is positioned within the mixer passage. The inner wall of the mixer passage and the outer surface of the fuel release body define a flow control section of the mixer passage. This flow control section of the mixer passage includes a flow restricting section positioned relatively near the inlet end of the mixer passage and a flow area increasing section toward the outlet end of the mixer passage with respect to the flow restricting section. The input air flow structure also includes a mixing chamber defined in the mixer passage between the flow area increasing section and the outlet end of the mixer passage.

The fuel release structure includes two separate sets of fuel release openings that open into the mixer passage. A plurality of first fuel release openings are positioned around a periphery of the flow area increasing section. A plurality of second fuel release openings are formed in an end surface of the fuel release body adjacent to the mixing chamber portion of the mixer passage. Also, a fuel supply structure is associated with both sets of fuel release openings and supplies gaseous fuel to the fuel release openings for release into the mixer passage.

In operation, input air to be mixed with gaseous fuel flows into the inlet end of the mixer passage and flows in a direction toward the outlet end of the mixer passage. In a preferred form of the invention, the input air is supplied under pressure through a suitable turbocharger or supercharger. When the input air reaches the flow restricting section of the mixer passage, the relatively narrow flow area restricts flow and creates a relatively higher pressure area upstream of the flow restricting section. After passing the flow restricting section, the input air flows into the flow area increasing section of the mixer passage which allows the input air to expand. The expansion and increased flow area produces a first relatively lower pressure or pressure reduction adjacent to the first fuel release openings which causes fuel to flow through the first fuel release openings into the input air flowing through the mixer passage. After the flow area increasing section, the air from the inlet end of the mixer passage and fuel from the first fuel release openings flow into the mixing chamber, swirling around the end of the fuel release body and across the end surface thereof. The expanding flow area in the mixing chamber portion of the mixer passage creates a second relatively lower pressure area adjacent to the end surface of the fuel release body, and causes fuel to flow out of the second fuel release openings into the swirling air and fuel mixture. The two separate fuel release locations and the swirling and turbulence produced by the flow control section of the mixer passage causes optimal fuel and air mixing prior to distribution or injection into the cylinders of an engine. Also, since the fuel release is dictated by the air flow through the mixer passage and the reduced pressures caused by the air flow, the mixer device also functions as a fuel metering device.

In the preferred form of the invention, both sets of fuel release openings are formed in the fuel release body and the fuel supply structure includes a central fuel release chamber formed in the fuel release body in communication with both sets of openings. The fuel release chamber receives fuel through an inner conduit which traverses the mixer body wall and the mixer passage to reach the fuel release body. The fuel supply structure also includes a diaphragm operated valve for supplying the appropriate amount of fuel to the fuel release chamber. When used with turbocharged and supercharged engines, the pressure in the mixer passage upstream of the flow restricting section balances the diaphragm so that fuel is released into the chamber only as needed to produce the desired fuel-air mixture.

According to the method of the invention, input air is first directed into the inlet end of the mixer passage. The method includes restricting air flow through the mixer passage at the flow restricting section and then directing air flow from the flow restricting section to a flow area increasing section of the mixer passage to produce a first pressure reduction in the flow area increasing section. The method next includes directing air flow from the flow area increasing section of the mixer passage to a mixing chamber to produce a second pressure reduction in the mixing chamber adjacent to the second fuel release openings. Finally, the method includes releasing gaseous fuel into the stream of input air at the flow area increasing section of the mixer passage and at the end surface of the fuel release body.

These and other objects, advantages, and features of the invention will be apparent from the following description of the preferred embodiments, considered along with the accompanying drawings.

BRIEF DESCRIPTION OF THE DRAWINGS

FIG. 2 is a mostly diagrammatic view, partially in section, showing a fuel supply structure and mixer apparatus embodying the principles of the invention.

DESCRIPTION OF THE PREFERRED EMBODIMENTS

Figure 1:
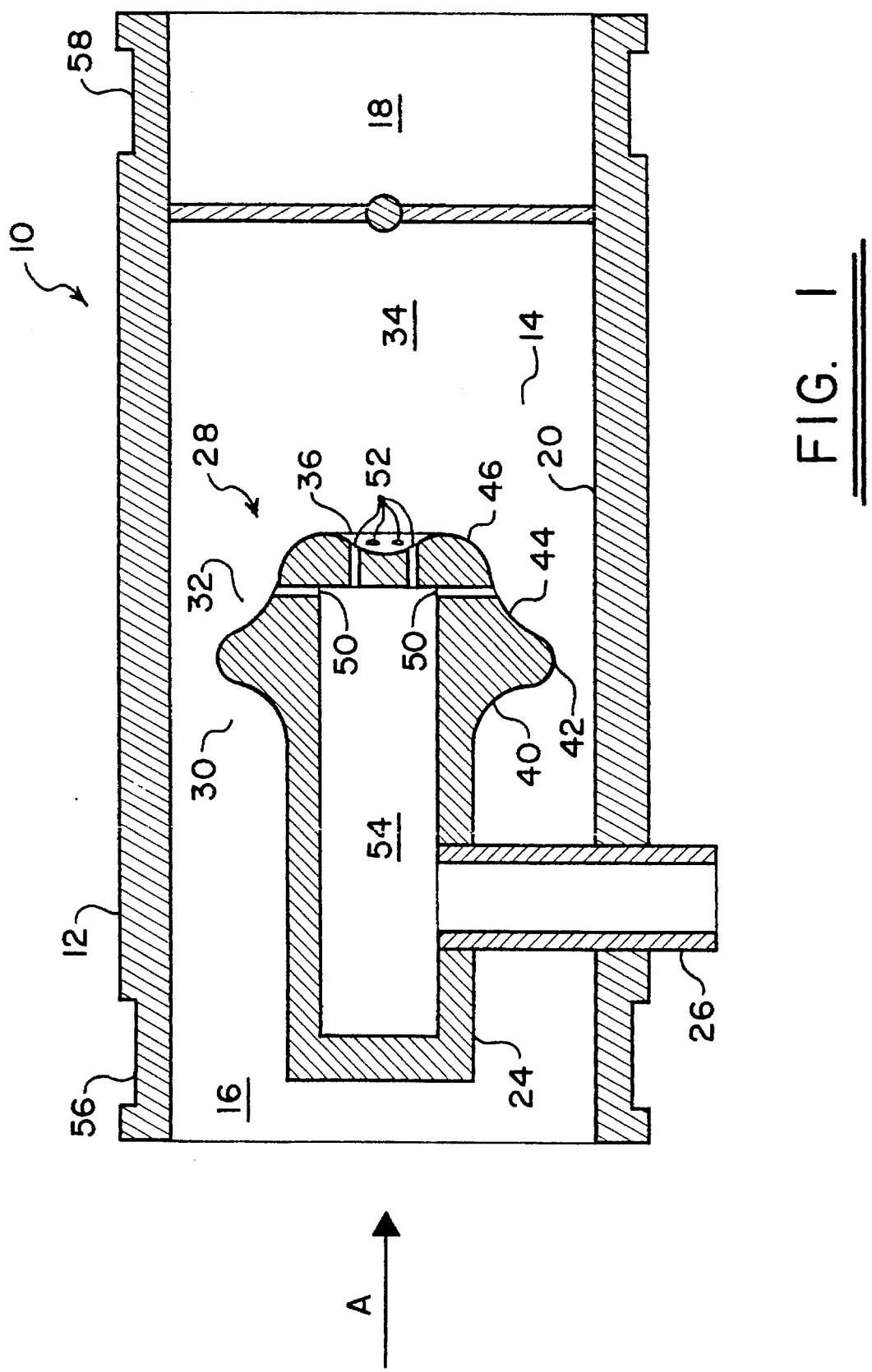
FIG. 1 is a view in longitudinal section of a mixer apparatus embodying the principles of the invention.

FIG. 1 shows a fuel-air mixer apparatus 10 embodying the principles of the invention. The mixer apparatus 10 includes a mixer body 12 with a mixer passage 14 extending longitudinally therethrough. The mixer passage 14 includes an inlet end 16 and an outlet end 18 and is defined by a passage wall 20. The illustrated form of the invention also includes a butterfly valve 22 positioned near the mixer passage outlet end 18. The butterfly valve 22 functions as a throttle for controlling the flow of fuel-air mixture from the mixer body 12. Although the throttle is preferably incorporated in the mixer body 12 as shown in FIG. 1, those skilled in the art will readily appreciate that a butterfly valve or other throttling device may be produced separately from the mixer body.

The mixer apparatus 10 also includes a fuel release body 24 positioned within the mixer passage 14. In the illustrated form of the invention, the fuel release body 24 is supported within the mixer passage 14 by a single rigid inner conduit 26 that extends through the wall of the mixer body. This inner conduit 26 will be discussed further below with reference to both FIG. 2. In alternate forms of the invention, the fuel release body 24 may be supported by other means such as several spaced apart supports extending between the passage wall 20 and the fuel release body. In any event, the support structure for supporting the fuel release body 24 should be situated so as to avoid substantial interference with air flow in the mixer passage between the passage wall 20 and the outer surface of the fuel release body.

A flow control section 28 of the mixer passage 14 is defined between the passage wall 20 and the outer surface of the fuel release body 24. The flow control section 28 includes a flow restricting section 30 and a flow area increasing section 32. Also, a mixing chamber 34 is defined in the mixer passage 14 between the outlet end 18 thereof and an end surface 36 of the fuel release body 24. The flow restricting section 30 comprises a section of decreasing flow area in a flow direction A from the inlet end 16 to the outlet end 18 of the mixer passage 14. The flow area increasing section 32 comprises a section in which flow area in the passage 14 increases in the direction of flow A.

In order to produce the increasing and decreasing flow areas, the outer surface of the fuel release body and the passage wall must be at an angle to each other. In the illustrated form of the invention, the passage wall 20 is straight, forming generally a cylindrical opening through the mixer body 12. All the curvature and contouring required to produce the flow restricting section 30 and flow area increasing section 32 is machined or otherwise formed on the outer surface of the fuel release body 24. However, those skilled in the art will readily appreciate that the curvature required to produce the flow restricting section 30 and flow area increasing section 32 may be formed in the passage wall rather than the outer surface of the fuel release body. Furthermore, both the passage wall and fuel release body may include curvature to produce the desired sections of decreasing flow area and increasing flow area.

As shown in FIG. 1, the flow restricting section 30 is formed by an outwardly fluted flow restricting surface 40 on the fuel release body 24. A rounded transition surface 42 produces the narrowest clearance between the passage wall 20 and the fuel release body 24 and separates the fuel restricting surface 40 from an inwardly fluted flow area increasing surface 44 in the flow area increasing section 32 of the mixer passage 14. The illustrated form of the invention also includes a rounded transition surface 46 between the flow area increasing surface 44 and the end surface 36 of the fuel release body 24. The preferred fuel release body end surface 36 includes a concave shape or dome opening outwardly toward of the outlet end 18 of the mixer passage 14.

According to the invention, the mixer apparatus 10 includes two separate sets of openings for releasing fuel into input air flowing through the mixer body passage 14. In the form of the invention illustrated in FIG. 1, the fuel release body 24 includes a set of first fuel release openings 50 spaced apart around the periphery of the flow area increasing surface 44 of the fuel release body. A plurality of second fuel release openings 52 are formed in the end surface 36 of the fuel release body 24. The second fuel release openings 52 are arranged in a ring centered on the longitudinal axis of the fuel release body 24. Both the first and second fuel release openings 50 and 52, respectively, in the illustrated form of the invention are in communication with a fuel release chamber 54 within the fuel release body 24. The fuel release chamber 54 is connected to receive gaseous fuel through the inner conduit 26 which also serves to support the fuel release body 24 in the illustrated form of the invention.

The mixer body 12 and fuel release body 24 may be formed from any suitable material that will not corrode substantially in the presence of moisture, air, and gaseous fuel, and can withstand the temperatures and pressures encountered in operation. In a preferred form of the invention, both the mixer body 12 and the fuel release body 24 are formed from a suitable aluminum or aluminum alloy material. Aluminum exhibits the desired resistance to corrosion and may also withstand the pressures and extreme temperature that may be placed upon the mixer apparatus components in operation.

In operation, the mixer body 12 is connected to receive input air from a suitable source and preferably a turbocharger or supercharger. The mixer body 12 includes a suitable flange 56 at the inlet end 16 for connecting to an input air supply (not shown) and a suitable flange 58 out the outlet end 18 for connecting to a conduit (not shown) leading to an engine manifold (also not shown).

Referring now to FIG. 2, the preferred fuel supply structure includes a fuel metering arrangement 20 that serves to meter the appropriate amount of gaseous fuel into the mixer body 12 for mixing with the input air. The metering arrangement 70 includes a diaphragm operated valve 72 actuated by a diaphragm 74 separating a diaphragm housing 76 into a balance chamber 78 and a fuel chamber 80. An inlet fuel conduit 82 connects the fuel chamber 80 of the diaphragm housing 76 to the inner fuel conduit 26 extending through the wall of the mixer body 12 and to the fuel chamber 54 within the mixer body 12. A flow restricting device such as a suitable orifice (not shown) is preferably placed in the inlet conduit 82 to limit the amount of fuel to a level at or below the amount required at peak engine output according to engine specifications. Also, when used in turbocharged or supercharged engines a balance conduit 84 extends from a port positioned in the mixer body 12 in the flow restricting section 30 of the mixer passage 14 to the balance chamber 78 of the diaphragm housing 76. In normally aspirated engines, the balance chamber 78 is simply open to atmospheric pressure. Fuel is supplied to the diaphragm operated valve 72 from a fuel storage tank 86 through a suitable conduit 88 and a regulator valve 90 for reducing the fuel pressure. Although FIG. 2 shows the regulator valve as separate from the diaphragm controlled valve, those skilled in the art will appreciate that the elements may be combined in a single structure.

The operation of the mixer body 12 and fuel metering arrangement 70 according to the invention may now be described with reference to FIGS. 1 and 2. Referring particularly to FIG. 2, input air for mixing with the gaseous fuel enters the mixer passage 14 through the inlet end 16 and flows in a flow direction A to the outlet end 18. As the air flows in the flow direction A it flows into the flow control section 28 of the mixer passage 14 passing first into the flow restricting section 30 and then into the flow area increasing section 32. As the input air flows into the flow restricting section 30, the relatively narrow air flow passage restricts air flow and creates a relatively higher pressure in the flow restricting section of the mixer passage 14. Once past the flow restricting section 30, the input air enters the flow area increasing section 32. The larger area for flow in the increasing flow area section 32 produces a first reduced pressure in the flow area increasing section, and particularly adjacent to the first fuel release openings 50. This first reduced pressure relative to the higher pressure area ahead in the flow restricting section 30 causes the diaphragm 74 in the diaphragm housing 76 to move toward the fuel chamber 80 of the diaphragm housing and open the diaphragm controlled valve 72 through spring biased lever 92 in contact with the diaphragm. The diaphragm controlled valve 72 then releases fuel into the fuel chamber 80 of the diaphragm housing 76. The fuel may then flow through the fuel line 82, into the fuel release chamber 54 and, ultimately, through the first fuel release openings 50 and into the mixer passage 14.

The air and fuel from the first fuel release openings 50 continues to flow in direction A, swirling around the end surface 36 of the fuel release body 24 and across the second fuel release openings 52. The relatively larger flow area in the mixing chamber portion 34 of the mixer passage 14 past the end surface 36 produces a second pressure reduction area adjacent to the end surface and the second fuel release openings 52. The reduced pressure adjacent to the second fuel release openings 52 allows gaseous fuel to flow through the second fuel release openings and into the swirling mixture of fuel from the first set of fuel release openings 50 and air from the input end 16 of the mixer passage. The turbulence induced by the air flow downstream from the second fuel release openings 52 causes the gaseous fuel and input air to mix thoroughly before exiting the mixer body through the outlet end 18 of the mixer passage 14.

The diameter of the mixer passage, and the size of the fuel release body and fuel release openings will depend upon the particular application of the invention. For example, for a wide range of engine displacements the inner diameter of the mixer passage may be approximately 2.35 inches and the maximum diameter of the fuel release body may be approximately 2 inches. In this example of the invention, the first fuel release openings 50 may include eight separate openings evenly spaced apart about the periphery of the flow area increasing surface 44 on the fuel release body 24, each opening being 0.12 inches in diameter. The second fuel release openings 52 may comprise eight separate openings spaced equally apart in a ring centered on the longitudinally axis of the fuel release body 24 with each second fuel release opening also being 0.12 inches in diameter.

The method according to the invention of mixing air and fuel for gaseous fuel internal combustion engines includes first directing input or makeup air into the inlet end 16 of the mixer passage 14, preferable under pressure from a turbocharger or supercharger. The method also includes restricting air flow through the mixer passage 14 at the flow restricting area 30, to produce a relatively high pressure in, or ahead of, the flow restricting area. After restricting the air flow through the mixer passage 14, the method continues with the step of directing the air flow from the flow restricting area to the flow area increasing section 32 of the mixer passage to produce a first pressure reduction in the flow area increasing section of the mixer passage. The flow through the passage 14 is next directed from the flow area increasing section 32 over the end 36 of the fuel release body 24 and into the mixing chamber 34 to produce a second pressure reduction in the fuel mixing chamber. Finally, the method includes releasing gaseous fuel into the flow area increasing section 32 of the mixer passage 14 at the point of the first pressure reduction, and releasing fuel into the mixing chamber 34 at the end 36 of the fuel release body 24, generally at the point of the second pressure reduction. The release of fuel at the two different reduced pressure locations, and the swirling and turbulence produced in the flow area increasing section 32 and mixing chamber 34 downstream from the fuel release body 24 cause thorough mixing of input air and fuel for optimal combustion in an internal combustion engine.

The above described preferred embodiments are intended to illustrate the principles of the invention, but not to limit the scope of the invention. Various other embodiments and modifications to these preferred embodiments may be made by those skilled in the art without departing from the scope of the following claims. For example, although the curved flow restricting and flow area increasing surfaces in the illustrated form of the invention are formed on the fuel release body, they may be formed at least partially by the mixer passage wall. Also, the first fuel release openings may be formed in the mixer passage wall rather than in the fuel release body. Furthermore, the surfaces forming the flow control section of the mixer passage may have any suitable curvature to produce the desired flow control and multiple reduced pressure areas for fuel release.

I claim:

1. A fuel-air mixer apparatus for gaseous fuel engines, the fuel-air mixer apparatus comprising:

(a) a mixer body having a mixer passage extending therethrough, the mixer passage defined by a mixer passage wall and having an outlet end and an inlet end;

(b) a fuel release body positioned within the mixer passage;

(c) a flow restricting outer surface formed on the fuel release body, a flow restricting section being defined between the flow restricting outer surface and the mixer passage wall;

(d) a flow area increasing surface formed on the fuel release body adjacent to the flow restricting surface and spaced from the flow restricting surface in a flow direction from the inlet end to the outlet end of the mixer passage, the flow area increasing surface extending at an angle to the mixer passage wall so that the area defined between the flow area increasing surface and the mixer passage wall increases in the flow direction;

(e) an end surface formed on the fuel release body, the end surface extending generally transversely to the mixer passage and facing the outlet end of the mixer passage;

(f) a plurality of first fuel release openings spaced apart around the periphery of the flow area increasing surface;

(g) a plurality of second fuel release openings spaced apart across the end surface; and (h) a fuel supply structure for supplying fuel to the first and second fuel release openings.

2. The fuel-air mixer apparatus of claim 1 further comprising:

(a) a flow control valve positioned at the outlet end of the mixer passage.

3. The fuel-air mixer apparatus of claim 1 wherein the flow restricting outer surface of the fuel release body includes:

(a) an outwardly fluted section widening toward the outlet end the mixer passage; and (b) a rounded end portion defining a minimum flow area with the mixer passage wall.

4. The fuel-air mixer apparatus of claim 1 wherein the flow increasing surface of the fuel release body comprises:

(a) an inwardly fluted section narrowing toward the outlet end of the mixer passage.

5. The fuel-air mixer apparatus of claim 4 wherein the plurality of first fuel release openings are evenly spaced apart around the inwardly fluted section of the fuel release body at a narrow end of said inwardly fluted section.

6. The fuel-air mixer apparatus of claim 1 wherein the fuel release body end surface comprises:

(a) a concave surface opening toward the outlet end of the mixer passage; and (b) a rounded transition section between the concave surface and the flow area increasing surface.

7. The fuel-air mixer apparatus of claim 6 wherein:

(a) the second fuel release openings are evenly spaced apart in a ring having a center coinciding with a longitudinal axis of the fuel release body.

8. The fuel-air mixer apparatus of claim 1 wherein:

(a) the fuel restricting outer surface of the fuel release body includes and outwardly fluted section widening toward the outlet end of the mixer passage and a rounded end portion defining a minimum flow area with the mixer passage wall;

(b) the flow increasing surface of the fuel release body comprises an inwardly fluted section narrowing toward the outlet end of the mixer passage;

(c) the first fuel release openings are evenly spaced apart around the inwardly fluted section at a narrow end relatively nearer the outlet end of the mixer passage;

(d) the fuel release body end surface comprises a concave surface opening toward the outlet end of the mixer passage with a rounded transition section between the concave surface and the flow increasing outer surface; and (e) the second fuel release openings are evenly spaced apart in a ring having a center coinciding with a longitudinal axis of the fuel release body.

9. The fuel-air mixer apparatus of claim 1 wherein the fuel supply structure includes:

(a) a fuel chamber formed within the fuel release body, the first and second fuel release openings in communication with said fuel chamber; and (b) an inner conduit extending through the mixer body to the fuel chamber within the fuel release body.

10. The fuel-air mixer apparatus of claim 9 wherein the fuel supply structure further includes:

(a) a diaphragm operated valve associated with a diaphragm housing with a flexible diaphragm diving the diaphragm housing into a fuel chamber and a balance chamber, the diaphragm operated valve being in communication with the fuel chamber of said diaphragm housing;

(b) a balance conduit in communication with the balance chamber and the mixer passage at a point between the inlet end thereof and the flow restricting outer surface of the fuel release body; and (c) a fuel conduit extending from the fuel chamber of the diaphragm housing to the inner conduit through the mixer body.

11. The fuel-air mixer apparatus of claim 10 wherein the fuel supply structure further includes:

(a) a fuel supply line extending from a fuel supply vessel to the diaphragm operated valve; and (b) a fuel pressure regulator valve positioned in the fuel supply line.

12. A fuel-air mixer apparatus for gaseous fuel engines, the fuel-air mixer comprising:

(a) a mixer body having a mixer passage extending therethrough, the mixer passage being defined by a mixer passage wall and having an outlet end and an inlet end;

(b) a fuel release body positioned within the fuel passage, a flow control section being defined between an outer surface of the fuel release body and the mixer passage wall;

(c) a flow restricting section included within the flow control section, the flow restricting area defining a narrow flow area between the fuel release body and the mixer passage wall;

(d) a flow area increasing section included within the flow control section adjacent to the flow restricting section toward the outlet end of the mixer passage, the flow area increasing section providing an increasing cross-sectional flow area in a flow direction from the inlet end to the outlet end of the mixer passage;

(e) a fuel release body end surface positioned adjacent to the flow area increasing section and facing the outlet end of the mixer passage;

(f) a plurality of first fuel release openings extending into the flow increasing area around a periphery thereof;

(g) a plurality of second fuel release openings spaced apart across the fuel release body end surface; and (h) a fuel supply structure for supplying fuel to the first fuel release openings and the second fuel release openings.

13. The fuel-air mixer apparatus of claim 12 further comprising:

(a) a fuel control valve positioned at the outlet end of the mixer passage.

14. The fuel-air mixer apparatus of claim 12 wherein the fuel supply structure includes:

(a) a fuel chamber formed within the fuel release body with the first and second fuel release openings in communication with said fuel chamber; and (b) an inner conduit extending through the mixer body to the fuel chamber within the fuel release body.

15. The fuel-air mixer apparatus of claim 14 wherein the fuel supply structure further includes:

(a) a diaphragm operated valve associated with a diaphragm housing with a flexible diaphragm diving the diaphragm housing into a fuel chamber and a balance chamber, the diaphragm operated valve being in communication with the fuel chamber of said diaphragm housing;

(b) a balance conduit in communication with the balance chamber and the mixer passage at a point between the inlet end thereof and the flow restricting outer surface of the fuel release body; and (c) a fuel conduit extending from the fuel chamber of the diaphragm housing to the inner conduit through the mixer body.

16. The fuel-air mixer apparatus of claim 15 wherein the fuel supply structure further includes:

(a) a fuel supply line extending from a fuel supply vessel to the diaphragm operated valve; and (b) a fuel pressure regulator valve positioned in the fuel supply line.

17. A method of mixing gaseous fuel and air for a gaseous fuel internal combustion engine, the method comprising the steps of:

(a) directing input air into a mixer passage;

(b) restricting the flow of input air through the mixer passage at a flow restricting section of the mixer passage to produce a relatively high input air pressure area;

(c) directing input air from the flow restricting section into a flow area increasing section of the mixer passage to produce a first pressure reduction in the flow area increasing section of the mixer passage;

(d) directing input air from the flow area increasing section of the mixer passage to a mixing chamber defined in the mixer passage to produce a second pressure reduction in the mixing chamber;

(e) releasing gaseous fuel into the flow area increasing section of the mixer passage; and (f) releasing gaseous fuel into the mixing chamber at a center section of the mixing chamber.

18. The method of claim 17 further comprising the steps of:

(a) supplying gaseous fuel to the mixer passage through a diaphragm controlled valve, the diaphragm controlled valve including a diaphragm housing divided by a flexible diaphragm into a fuel chamber and a balance chamber; and (b) applying the relatively high input air pressure to the balance chamber.

* * * * *